United States Patent

Ohtsuka et al.

[11] Patent Number: 6,062,740
[45] Date of Patent: May 16, 2000

[54] OPTICAL CONNECTOR AND METHOD OF MAKING THE SAME

[75] Inventors: Kenichiro Ohtsuka; Tomohiko Ueda; Toshiaki Kakii; Hiroshi Katsura, all of Yokohama, Japan

[73] Assignee: Sumitomo Electric Industries, Ltd., Osaka, Japan

[21] Appl. No.: 09/139,665

[22] Filed: Aug. 25, 1998

[30] Foreign Application Priority Data

Aug. 25, 1997 [JP] Japan ................................ 9-228229
Aug. 28, 1997 [JP] Japan ................................ 9-232302
Jul. 15, 1998 [JP] Japan ............................... 10-200601

[51] Int. Cl.[7] ............................................. G02B 6/36
[52] U.S. Cl. ......................... 385/81; 385/83; 385/80; 385/77
[58] Field of Search ........................... 385/81, 76, 77, 385/78, 80, 82, 83, 84, 85, 59, 65, 71, 72

[56] References Cited

U.S. PATENT DOCUMENTS 5,602,951  2/1997  Shiota et al. ............................ 385/81
5,923,803  7/1999  Bunin et al. ............................ 385/80

FOREIGN PATENT DOCUMENTS

2-624566  4/1997  Japan .
9-159860  6/1997  Japan .

Primary Examiner—Phan T. H. Palmer
Attorney, Agent, or Firm—Pillsbury Madison & Sutro LLP

[57] ABSTRACT

An optical connector in which an optical fiber is fixed within a ferrule such that a tip of the optical fiber is disposed at a front end face position of the ferrule. An optical-fiber-positioning hole formed so as to directly extend into the ferrule from an optical connecting orifice formed in the front end face of the ferrule has a diameter greater than a diameter of the optical fiber positioned within the optical-fiber-positioning hole, the optical-fiber-positioning hole having therein a compressible unfixing area for allowing the optical fiber to compress along the optical-fiber-positioning hole, and a fixing area, disposed behind the compressible unfixing area, for fixing the optical fiber to the ferrule.

12 Claims, 9 Drawing Sheets

OPTICAL CONNECTOR AND METHOD OF MAKING THE SAME

BACKGROUND OF THE INVENTION

1. Field of the Invention

The present invention relates to an optical connector for connecting optical fibers to each other.

2. Related Background Art

Physical-Contact (PC) connection in which end faces of optical fibers are butted against and brought into contact with each other so as to form an optical link is employed in optical connectors. In a multicore optical connector, secure PC connection cannot be established when tip faces of optical fibers become irregular. Hence, there has been developed a technique for eliminating such irregularity and effecting secure PC connection.

For example, known technique for PC connection is disclosed in Japanese Patent Application Laid-Open No. 9-159860 (hereinafter referred to as Conventional Example 1) and a technique for curing irregular tip faces is disclosed in Katagiri et al., "A Study on Quickly & Easily Assembling Techniques of Multifiber Connector," (Communications Society Conference of the Institute of Electronics and Information and Communication Engineers, 1997, B-10-35) (hereinafter referred to as Conventional Example 2).

In Conventional Example 1, wherein optical connection is performed by utilizing the buckling of optical fibers, predetermined amounts of optical fibers are caused to project from the front end face of a ferrule, and the inside of the ferrule is provided with a flexing space in which the optical fibers are movable in the diametrical direction as well. This flexing space is used for buckling the optical fibers upon PC connection, thereby aligning their end faces with each other so as to establish secure PC connection.

In Conventional Example 2, optical fibers are connected with their end faces aligned with each other by buckling the optical fibers in a flexing space disposed inside the ferrule as in Conventional Example 1.

SUMMARY OF THE INVENTION

These optical connectors, however, have the following problems due to their configurations mentioned above.

In the optical connector of Conventional Example 1, a forced load is applied to the optical fibers as they are buckled, whereby optical transmission loss may occur in the optical fibers in the ferrule and, in some cases, there is a possibility of the optical fibers breaking.

In the optical connector of Conventional Example 2, if there is too much irregularity in the tip faces of the optical fibers, the flexing of the optical fibers may be increased. As a result, the bending radius of an optical fiber may become so small as to increase its optical transmission loss or cause its buckle.

In view of the foregoing problems, it is an object of the present invention to provide an optical connector in a simple and compact configuration in which optical transmission loss is prevented from occurring and optical fibers are kept from breaking; and a method of making the same.

In order to overcome the above-mentioned problems, the present invention provides an optical connector in which an optical fiber is fixed within a ferrule such that a tip of the optical fiber is disposed at a front end face position of said ferrule, wherein an optical-fiber-positioning hole formed so as to directly extend into the ferrule from an optical connecting orifice formed in said front end face of said ferrule has a diameter greater than a diameter of said optical fiber positioned within said optical-fiber-positioning hole, said optical-fiber-positioning hole having therein a compressible unfixing area for allowing the optical fiber to compress along said optical-fiber-positioning hole, and a fixing area, disposed behind the compressible unfixing area, for fixing said optical fiber to said ferrule.

In accordance with the present invention, since the optical fiber is not fixed within its fiber-positioning hole disposed on the front end face side of the ferrule, the optical fiber is longitudinally compressible. The tip end position of the optical fiber can be fine adjusted with compression. Namely, by compressing the optical fibers during PC connection, PC connection can be securely established without generating optical transmission loss due to bad connection. Also, upon the longitudinal compression, an optical fiber-positioning hole functions as a guide for compressing the optical fiber in the longitudinal direction. As a consequence, neither flexing nor buckling would occur, and the optical fiber is prevented from breaking.

The ferrule has a plurality of optical-fiber-positioning holes, in each of which an optical fiber is arranged so as to be longitudinally movable therein. Preferably the positions of the tips of the optical fibers thus arranged do not fluctuate excessively with respect to the permissible amounts of compression of the respective optical fibers within the optical-fiber-positioning holes.

On the other hand, the present invention provides a method of making an optical connector in which a plurality of optical fibers are secured within a ferrule such that end faces thereof align with each other with a predetermined pitch near a front end face position of the ferrule, the method comprising a step of arranging the optical fibers with substantially uniformly cut-off tips, one by one, into tubular fiber-positioning holes each having an inside diameter greater than an outside diameter of each optical fiber and straightly extending inward from the front end face thereof, the optical fibers being arranged so as to be longitudinally movable and in a manner that the positions of the tips of the optical fibers do not fluctuate excessively with respect to the permissible compression of the respective optical fibers within the fiber-positioning holes; and a step of securing the optical fibers to the ferrule behind the fiber-positioning holes.

In accordance with the present invention, since the optical fibers are arranged such that their fluctuations in tip face positions are within an allowable extent with respect to the permissible amount of compression of the optical fibers determined by the lengths of their corresponding fiber-positioning holes, these fluctuations in the tip face positions can be absorbed by longitudinally compressing the optical fibers. Namely, by compressing the optical fibers upon PC connection, their tip face positions align with each other, whereby PC connection can be securely established in an optical connector having a plurality of optical fibers as well, without any fear of generating optical transmission loss.

The fixing area may have an optical-fiber-aligning groove, formed behind the optical-fiber-positioning hole, for disposing the optical fiber, and an optical-fiber-pressing member for fixing the optical fiber within the optical-fiber-aligning groove by pressing the optical fiber against a wall face of the optical-fiber-aligning groove.

By pressing the optical fiber against a wall face of the optical-fiber-aligning groove with an optical-fiber-pressing member, the optical fiber can be easily and securely fixed to the ferrule.

The aligning groove may have substantially a C-like shape, an inside diameter slightly greater than an outside diameter of the optical fiber, and a depth and an opening width of an upper part of the groove each of which is smaller than the outside diameter of the optical fiber, and the optical fiber projects from the opening. In this case, the optical fiber may be securely fixed to the ferrule without bend or extrusion.

Preferably, the optical fibers are pre-compressed such that their tip faces are aligned substantially in parallel to the front end face of the ferrule. Preferably, the manufacturing method further comprises, subsequent to the aligning step, an adjusting step of longitudinally compressing the optical fibers in the respective fiber-positioning holes such that their tip positions are aligned substantially in parallel to the front end face.

When the optical fibers are pre-compressed such that their tip positions align with each other, their amount of fluctuation in tip face position can further be reduced. In the case where the aligning groove portion is provided, when the optical fiber is made longitudinally compressible within the aligning groove portion as well, the amount of fluctuation can further be adjusted. In particular, using the C-shaped aligning groove is preferable since there is no fear of the optical fiber flexing. Providing the aligning groove portion is also advantageous in that the length of the fiber-positioning hole can be reduced.

Preferably, in the adjusting step, a pressing member for restricting only the diametrical movement of the optical fibers is disposed behind the fiber-positioning holes. This configuration is preferable in that the optical fibers can be compressed only in the longitudinal direction behind the fiber-positioning holes as well, whereby the optical fibers would neither flex nor buckle.

A pressing member for pressing the periphery of the optical fibers may be disposed behind the fiber-positioning holes. More preferably, this pressing member also functions as the pressing member mentioned above. This case is advantageous in that it becomes further easier to securely fix the optical fibers to ferrule after compression.

And the optical-fiber-positioning hole in the compressible unfixing area is preferably filled with a refractive-index-matching agent because the refractive-index-matching agent intrudes to connecting boundary face of PC connection.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 9 is a view showing a state where an optical fiber in an aligning groove of the optical connector of FIG. 1 is compressed with no pressing member, whereas

FIG. 14 is an exploded perspective view showing a third embodiment of the optical connector in accordance with the present invention, whereas

DESCRIPTION OF THE PREFERRED EMBODIMENTS

In the following, preferred embodiments of the present invention will be explained in detail with reference to the accompanying drawings. For making it easier to understand the explanation, constituents identical to each other among the drawings will be referred to with numerals identical to each other whenever possible, without repeating their overlapping descriptions. Sizes and shapes in the drawings are sometimes exaggerated for convenience of explanation, and ratios in sizes of the individual parts do not always correspond to those in practice.

Figure 1:
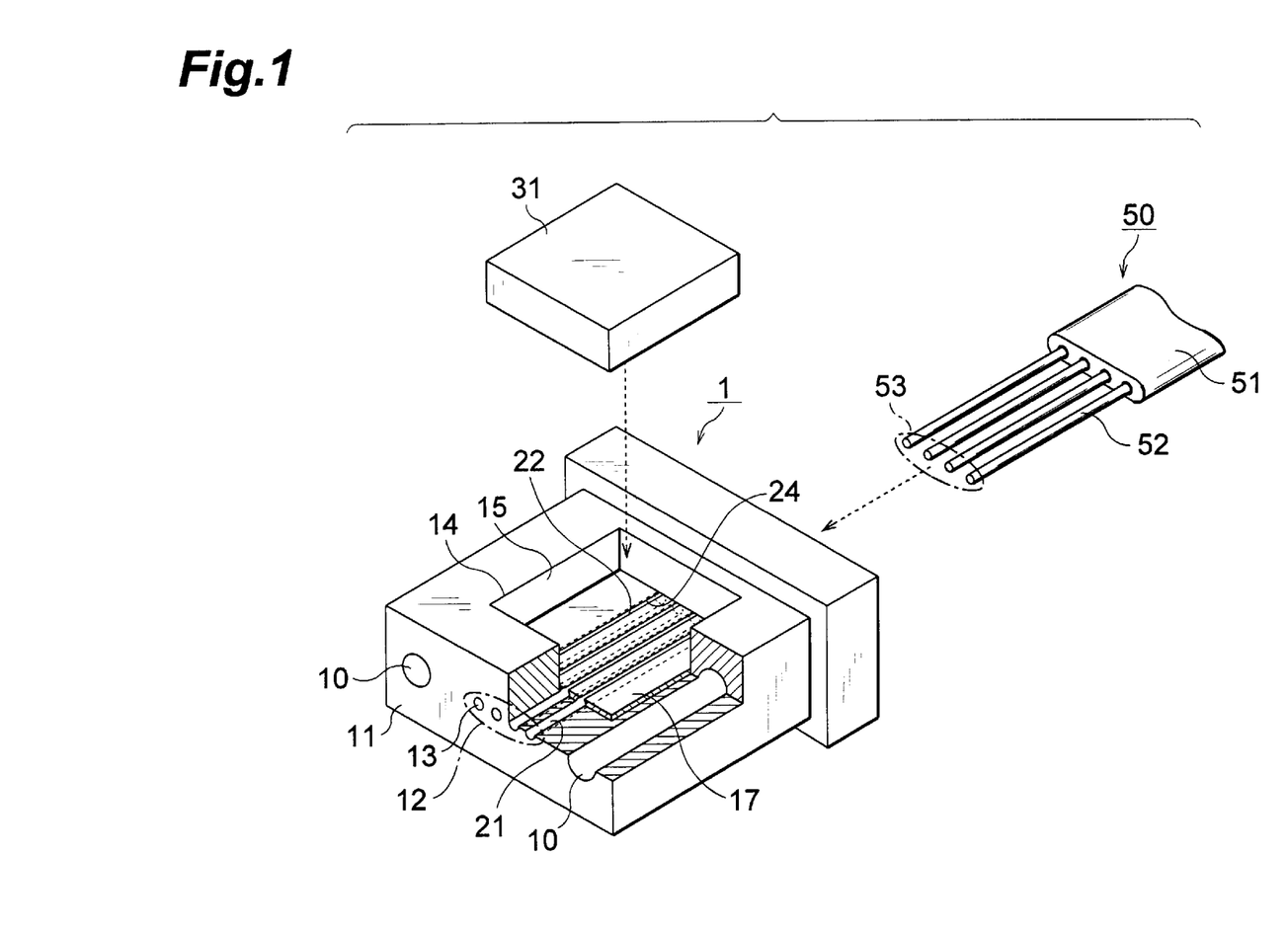
FIG. 1 is an exploded perspective view of a first embodiment of the optical connector in accordance with the present invention.

FIG. 1 is an exploded view showing a first embodiment of the optical connector in accordance with the present invention. This optical connector has a ferrule 1 for securing four (4-core) bare optical fibers 52 exposed by removing a coating 51 from a tip portion of a ribbon-shaped coated optical fibers (hereinafter referred to as "fiber ribbon") 50. As with a conventional MT connector, the ferrule 1 is integrally molded from a resin, and its front end face 11 is formed flat for end-face butting with an opposite optical connector. The front end face 11 is formed with optical connecting orifices 13 arranged in a row with a predetermined pitch, which form an optical connecting portion 12. Both sides of the optical connecting portion 12 are each provided with an insertion hole 10 for receiving a guide pin used for connecting optical connectors together. The upper face of the ferrule 1 is hollowed at its center part to form a recess 14.

Figure 2:
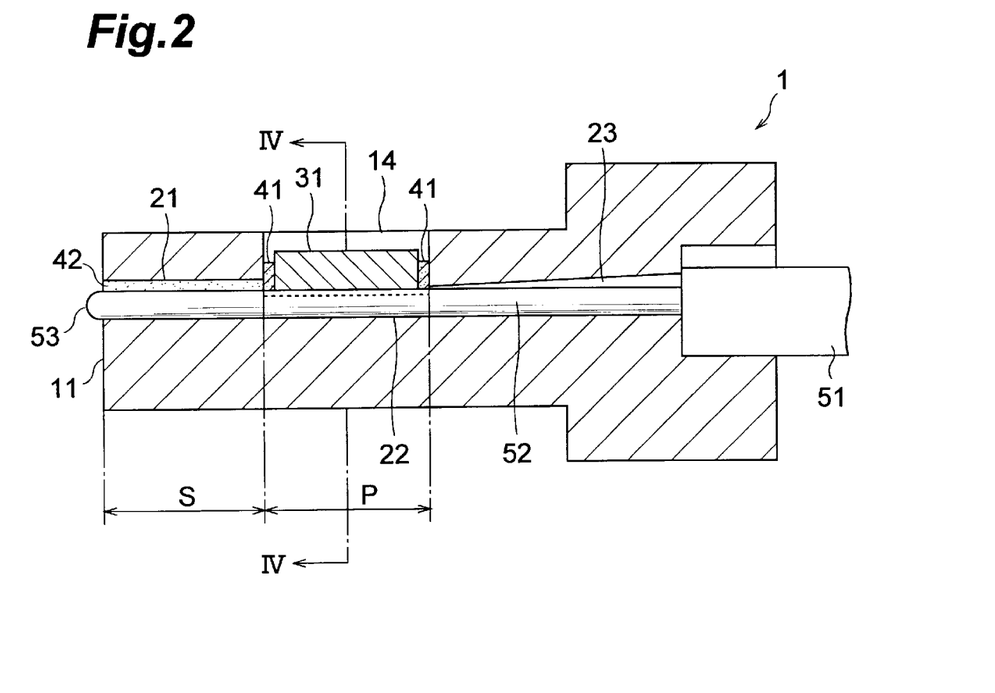
FIG. 2 is a vertical sectional view thereof.
Figure 3:
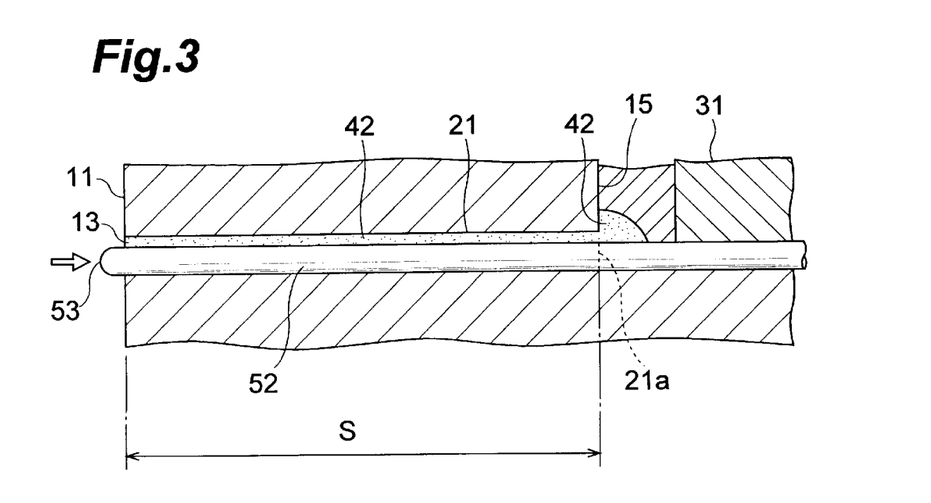
FIG. 3 is an enlarged view thereof near its front end face portion.
Figure 4:
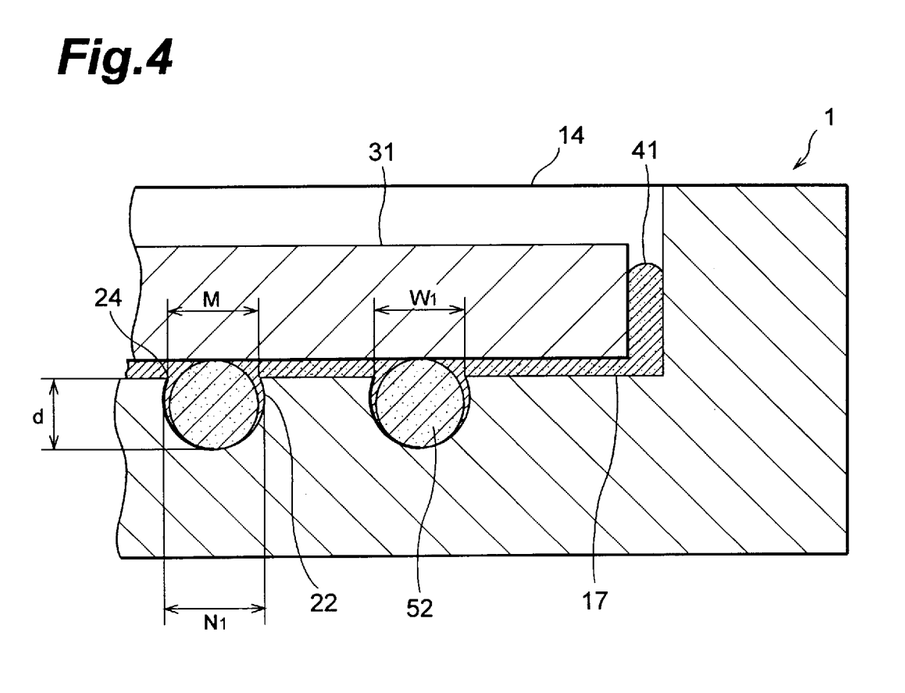
FIG. 4 is a transverse sectional view thereof.

The center part of the bottom face 17 of the recess 14 forms a fiber-fixing portion for securing the optical fibers 52. FIG. 2 is a vertical sectional view of the optical connector in its assembled state, whereas FIG. 3 is an enlarged view thereof near its front end face 11. FIG. 4 is a transverse sectional view of the optical connector across the recess 14. As shown in FIGS. 2 to 4, four fiber-positioning holes 21 for receiving the respective optical fibers 52 are arranged within the ferrule 1. For fulfilling compression type PC connection, each positioning hole 21 extends straightly from the front end face 11 of the ferrule 1 toward the inside thereof. The front end opening of each fiber-positioning hole 21 forms its corresponding optical connecting orifice 13. As depicted, the inside diameter of the positioning hole 21 is made greater than the outside diameter of the fiber 52. Specifically, for example, for the optical fiber 52 having a diameter of 125

μm, the positioning hole 21 is formed with a diameter N of 126 μm, thereby yielding a minute diameter difference of 1 μm, with which the optical fiber 52 is positioned within the positioning hole 21 so as to be longitudinally movable. Consequently, when the optical fiber 52 is thus set in an unfixed state, the optical fiber 52 within the minute positioning hole 21 is substantially compressed in the longitudinal direction alone, whereby it can be compressed substantially uniformly without buckling. The above-mentioned difference in diameter is appropriately determined as a difference in diameter by which the optical fiber 52 can be easily compressed in the longitudinal direction alone within the fiber-positioning hole 21 but being diametrically fixed so as not to be buckled.

Further, in the bottom face 17, behind each fiber-positioning hole 21, i.e., opposite to the optical connecting orifice 13, an optical fiber aligning groove 22 having substantially a C-shaped cross section is formed continuously with the positioning hole 21. The inside diameter $N_1$ of the aligning groove 22 is also formed slightly greater than the outside diameter of the optical fiber 52. Specifically, it is preferred that the former be greater than the latter by about 2 μm. The upper face of each aligning groove 22 is provided with a slit-shaped opening 24 having a width $W_1$ smaller than the diameter M of the optical fiber 52. The opening 24 extends over the bottom face 17 along the longitudinal direction. The aligning groove 22 has a depth d smaller than the outside diameter of the optical fiber 52, thereby partly exposing the periphery of the optical fiber 52 from the opening 24. Specifically, in the case where the diameter M of the optical fiber 52 is 125 μm, the width $W_1$ of the opening 24 is suitably set to 90 to 110 μm. The amount of protrusion of the optical fiber 52 from the bottom face 17 is preferably about 30μm. Namely, the depth d is about 95 μm.

Above the aligning grooves 22, a block-shaped fiber-pressing member 31 is disposed so as to be placed within the recess 14. The pressing member 31 is smaller than the recess 14, and an adhesive 41 fills the space therebetween, thereby fixing each optical fiber 52 to the ferrule 1. Near area of the positioning hole 21 is filled with a refractive-index-matching agent 42. Formed behind each aligning groove 22 continuously therewith is a tubular guide portion 23 shaped like a truncated circular cone having an inside diameter gradually increasing toward the rear side.

Figure 5:
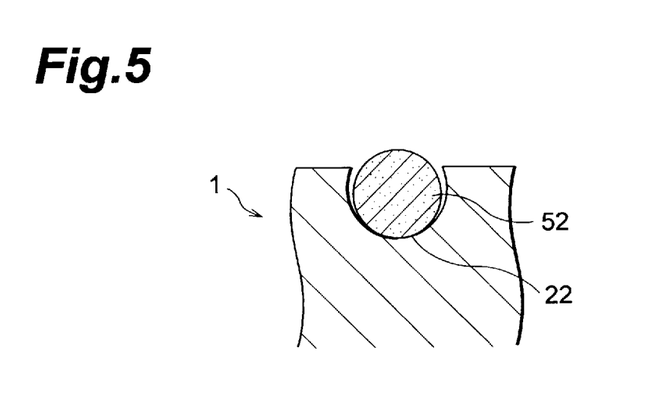
FIG. 5 is an enlarged view of an aligning groove portion in FIG. 4.

A method of making (assembling) this optical connector will now be explained. As shown in FIG. 1, the optical fibers 52 from which the coating 51 is removed to expose their fibers are inserted into the ferrule 1 from the rear side (side opposite to the front end face 11), i.e., from the guide portion 23 side. Before inserting the optical fibers 52, the positioning holes 21 are at least partly filled with a greasy refractive-index-matching agent 42 having a high viscosity to prevent influx of the adhesive into the positioning holes 21. Here, since the inside diameter of the rear end part of each guide portion 23 is greater than the outer diameter of each optical fiber 52 as mentioned above, the tip face 53 of the optical fiber 52 can be easily inserted into the guide portion 23. The tip face 53 of thus inserted optical fiber 52 passes through the positioning hole 21 by way of the guide portion 23 and the aligning groove 22, thereby projecting from the optical connecting orifice 13 by a predetermined amount. FIG. 5 indicates the state of the optical fiber 52 within the aligning groove 22 at th at time. As depicted, each optical fiber is disposed in a state where its periphery partly projects from the bottom face 17.

Figure 6:
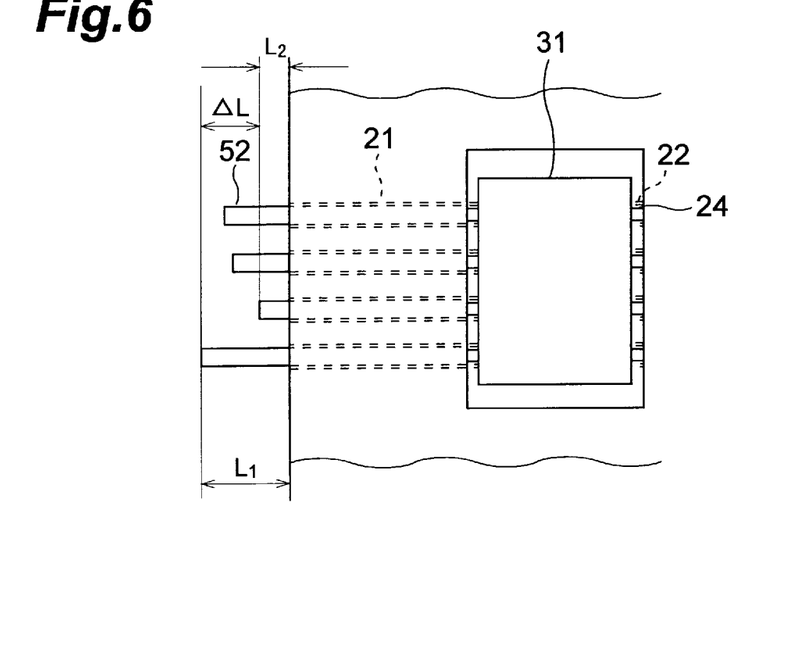
FIGS. 6 to 8 are views showing an optical fiber compressing step for the optical connector of FIG. 1.

Here, positions of the tip faces 53 of the optical fiber 52 projecting from the front end face 11 of the ferrule 1 may fluctuate in the longitudinal direction. Though such a fluctuation may occur when cutting and aligning the tips of the optical fibers 52, it is not necessary for the tip faces 53 of the optical fibers 52 to strictly align with each other in the present invention for the reason explained below. Specifically, as shown in FIG. 6, the amount of projection of the end face of each optical fiber 52 after insertion ranges from a maximum of L1 to a minimum of L2, thereby yielding a difference of ΔL in the position of the tip face 53. In a 4-core optical fiber, about 10 μm fluctuation ΔL has occurred.

Figure 7:
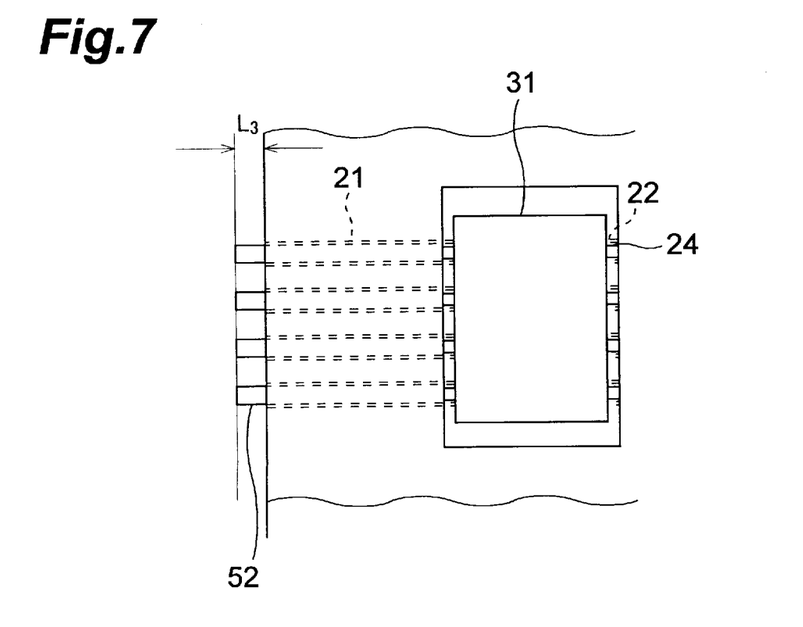

First, in order to reduce this fluctuation, as shown in FIG. 6, a block-shaped pressing member 31 is disposed so as to cover the openings 24 of the aligning grooves 22, and the pressing member 31 may be pressed with such a slight pressing force to allow the optical fibers 52 to move longitudinally without causing them to protrude from the openings 24, thereby restraining them from moving diametrically. Then, as shown in FIG. 7, the tip of the optical fiber 52 is pressed against the wall face of a predetermined processing tool. Then, the individual optical fibers 52 are longitudinally compressed within their positioning holes 21 and aligning grooves 22, whereby their tip faces 53 align with each other at the same position. Here, in order to effectively absorb the typical amount of fluctuation ΔL, which ranges from 2 to 20 μm, it is necessary for the sum of the respective lengths S and P of the positioning hole 21 and aligning groove 22 to be about 2 to 10 mm. Upon this compression, since the inside diameter of each of the positioning hole 21 and aligning groove 22 is only slightly greater than the outside diameter of the optical fiber 52, the fiber 52 is guided by the positioning hole 21 and the aligning groove 22, thereby being prevented from moving diametrically. As a consequence, a compressive force is substantially uniformly applied to the optical fibers 52 in the longitudinal direction, and consequently there occurs neither flexing nor buckling of the optical fibers. As a result, the tips of the optical fibers 52 can be aligned substantially in parallel to the front end face 11.

In the early stage of compression, a compressive force is applied to only the most projective one of optical fibers 52. Then, the number of the optical fibers 52 to which the compressive force is applied successively increases in the order of their amounts of projection, until the compressive force is applied to all the optical fibers 52 in the end. Since this compressive force is required to be not greater than the buckling load, the most simple way of controlling the total compressive force is to suppress it to the buckling load of one optical fiber or less. In this case, the larger the number of cores is, the smaller becomes the compressive force applied to one optical fiber when all the optical fibers are compressed, thus reducing the amount of compression of the optical fiber per unit length. Hence, in order to absorb fluctuations, it is necessary for each optical fiber to have a long length of unfixed portion. In the present invention, since each optical fiber is guided upon compression, it would not flex even when the total length of its compressing portion is made greater. Consequently, fluctuations in the tip faces can be absorbed effectively.

Figure 8:
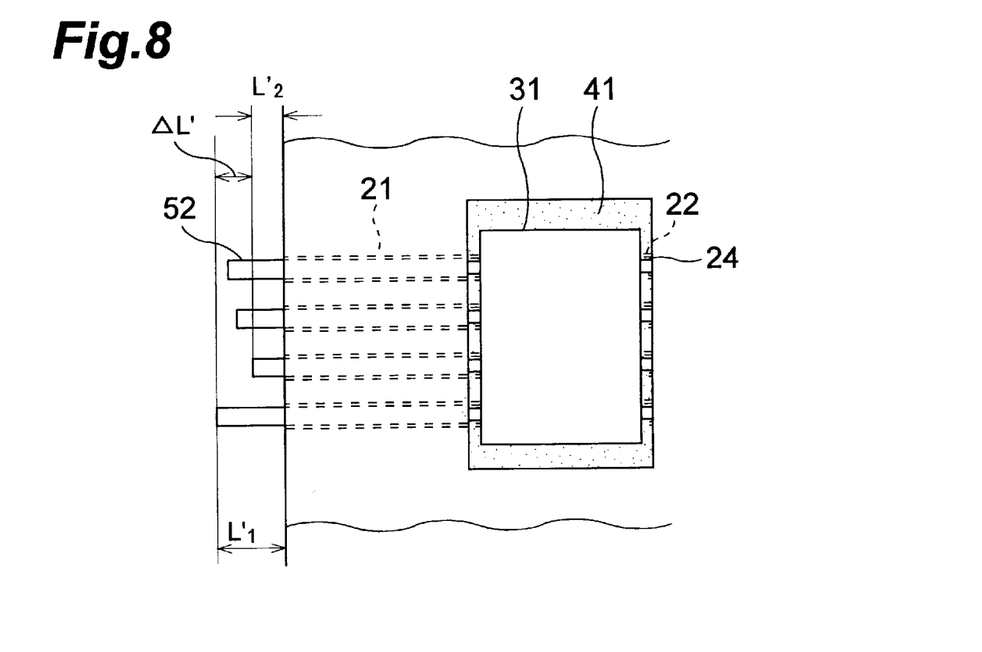

In the state where the tip faces of the optical fibers 52 thus align with each other, the adhesive 41 is injected into the recess 14 from around the pressing member 31 and is solidified there. Since each of the positioning hole 21 has already been filled at least partly with the highly viscous refractive-index-matching agent 42 as mentioned above, the adhesive 41 does not enter this part but is spread into the space surrounding the periphery of the optical fiber 52 within each aligning groove 22 (see FIGS. 3 and 4). When the refractive-index-matching agent 42 is wiped out and the tip faces 53 of the optical fibers 52 are separated from the wall face of the processing member after the adhesive 41 is solidified, the optical fibers 52 expand again since they are released from the compressive force as shown in FIG. 8. Within the aligning grooves 22, however, the optical fibers 52 are in their compressed state and would not return to normal. As a consequence, both the maximum amount L1' and minimum amount L2' of projection of their front end faces 53 become smaller than those before compression, and the amount of fluctuation ΔL' decreases as well. This amount of fluctuation would remain without being completely nullified. Since each optical fiber 52 is longitudinally compressible within the positioning hole 21 even after the adhesive 41 is solidified, however, the fluctuations in the tip faces 53 are absorbed by compression of the optical fibers 52 within the positioning holes 21 upon PC connection. Consequently, secure PC connection is possible.

In this embodiment, it is unnecessary to cut and align the tip faces 53 of the optical fibers 52 which are unevenly projecting from the front end face 11 of the ferrule 1 as a result of being simply cut-off in the preveous step and inserted into the ferrule 1. Thus, the mounting operation of the optical fibers 52 as a whole can be carried out quite rapidly. Further, in the case where amounts of projection of the optical fibers 52 have changed due to thermal expansion, the tip faces 53 are positionally adjusted upon compression, whereby the thermal expansion can be absorbed. In the case where aerial discharge is to be effected in order to round off the tips of the optical fibers 52, it may be carried out either before and after inserting the optical fibers 52 into the ferrule 1.

Figure 9:
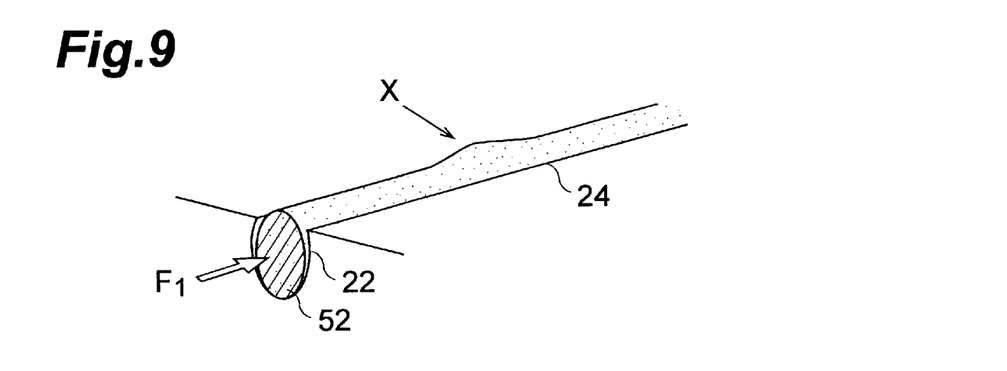
Figure 10:
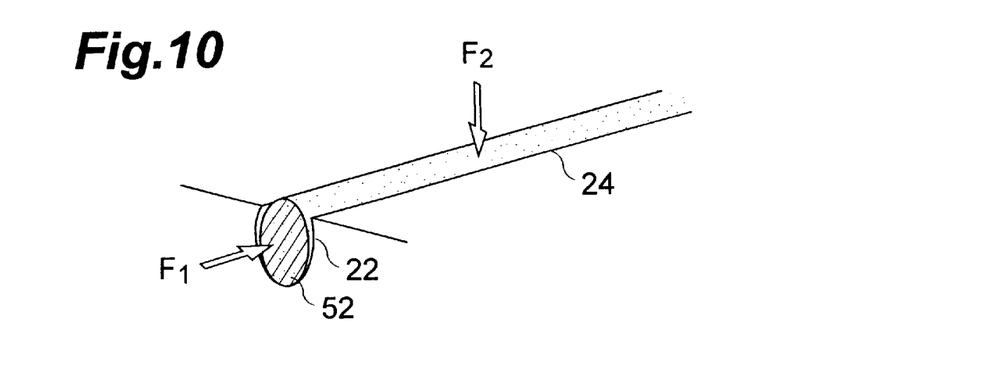
FIG. 10 is a view showing a state where it is compressed with a pressing member.

For compressing the optical fibers 52, it is not always necessary to diametrically press the optical fibers 52 with the pressing member 31 so as to restrain them from moving diametrically. In the case where the opening slit 24 of the aligning groove 22 has a large width, however, the optical fiber 52 therein may be flexed by a compressive force $F_1$ as shown in FIG. 9. Consequently, as shown in FIG. 10, for securely effecting compression without flexing, it is preferred that a diametrical pressing force $F_2$ be applied to the optical fiber 52 so as to restrict its diametrical movement. A pressing force $F_2$ of about 10 g is sufficient for a single optical fiber. Too high a pressing force is unfavorable since it also restrains the optical fibers 52 from being longitudinally compressed.

Though explained above is the case where each aligning groove 22 is a C-shaped groove, the aligning groove may also be a V- or U-shaped groove. In the case where a V- or U-shaped groove is used, the opening slit 24 may become so wide that there is a possibility of the optical fiber 52 flexing to such an extent that it protrudes from the opening slit 24. Hence, the pressing member is more preferably used together therewith.

Employable as the adhesive are thermosetting adhesive, cold-setting adhesive, instant adhesive, UV-curing adhesive, and the like.

In the following, other embodiments of the optical connector in accordance with the present invention will be explained.

Figure 11:
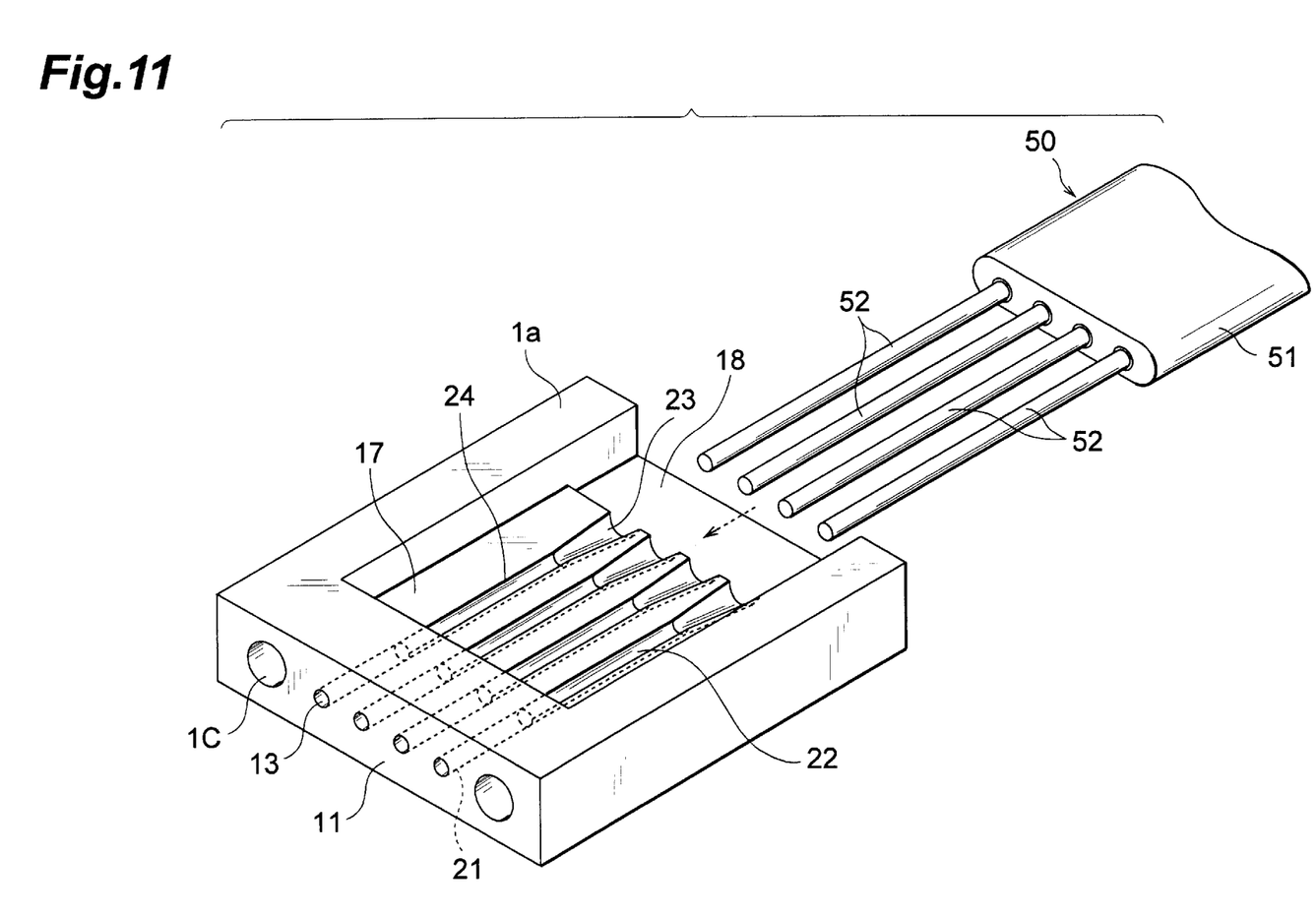
FIG. 11 is an exploded perspective view showing a second embodiment of the optical connector in accordance with the present invention.
Figure 12:
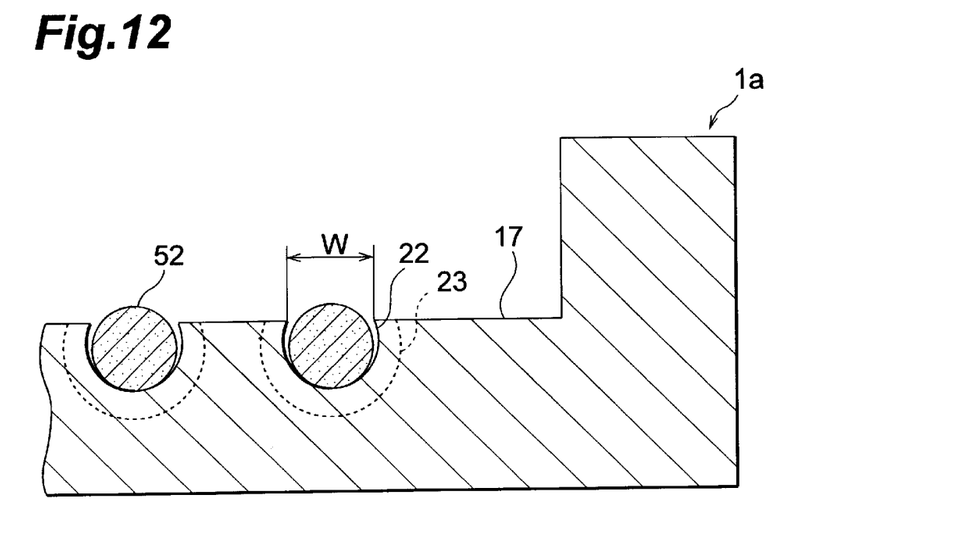
FIG. 12 is a transverse sectional view thereof.
Figure 13:
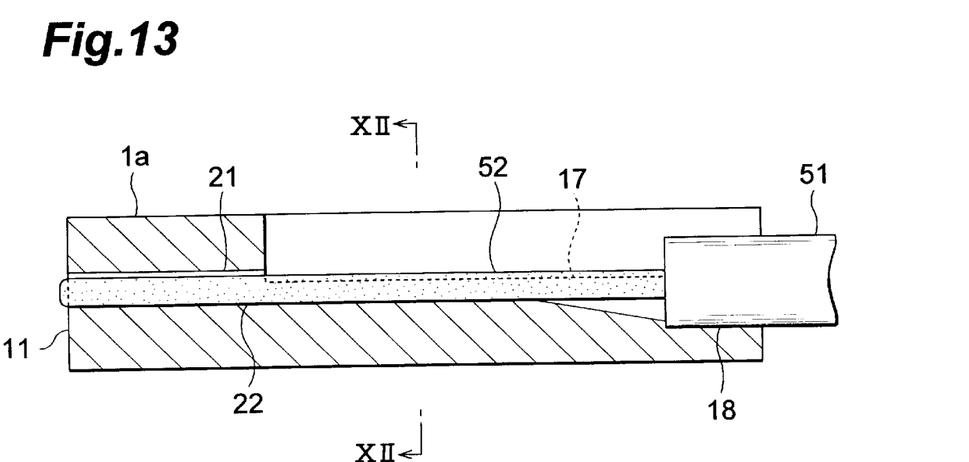
FIG. 13 is a vertical sectional view thereof.

FIG. 11 is an exploded perspective view showing a second embodiment of the optical connector in accordance with the present invention; whereas FIGS. 12 and 13 are transverse and vertical sectional views thereof, respectively. The ferrule 1a of this optical connector differs from the ferrule 1 of the optical connector in accordance with the first embodiment shown in FIG. 1 only in its structure on the side for receiving the optical fibers 52. Though each guide portion 23 in the ferrule 1 of the first embodiment is tubular, the ferrule 1a in the second embodiment has an open end on the side for receiving the optical fibers 52, and groove-shaped guide portions 23 are formed on the exposed bottom face 17 so as to connect with their corresponding aligning grooves 22. Disposed behind the groove-shaped guide portions 23 is a bottom face 18 for mounting the coating 51 of the fiber ribbon 50.

Effects similar to those of the first embodiment can be obtained in the optical connector of the second embodiment as well. Since the receiving side of each guide portion 23 has an upward open shape, the ferrule 1b of the optical connector is advantageous in that optical fibers can be inserted therein more easily.

Figure 14:
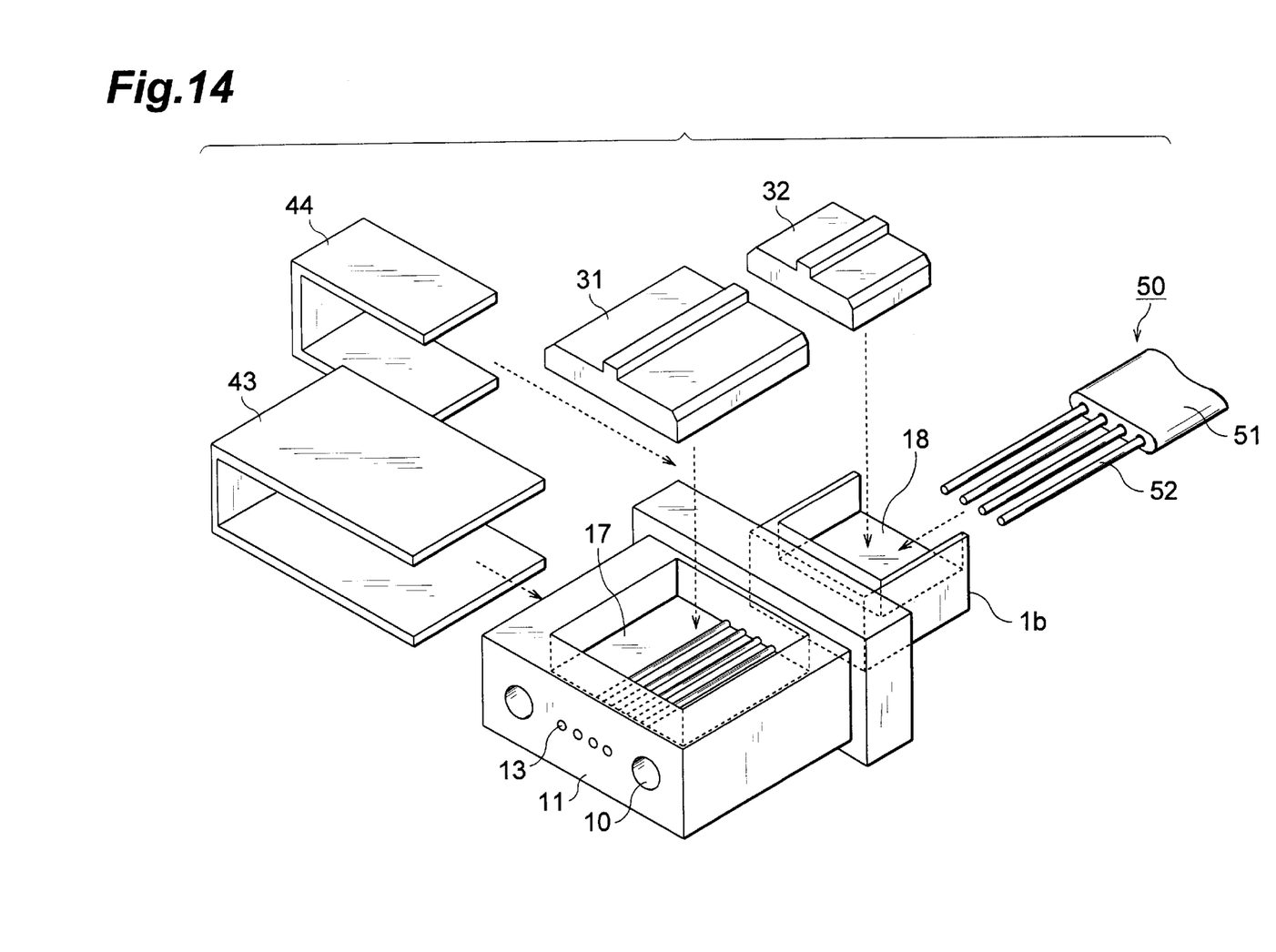
Figure 15:
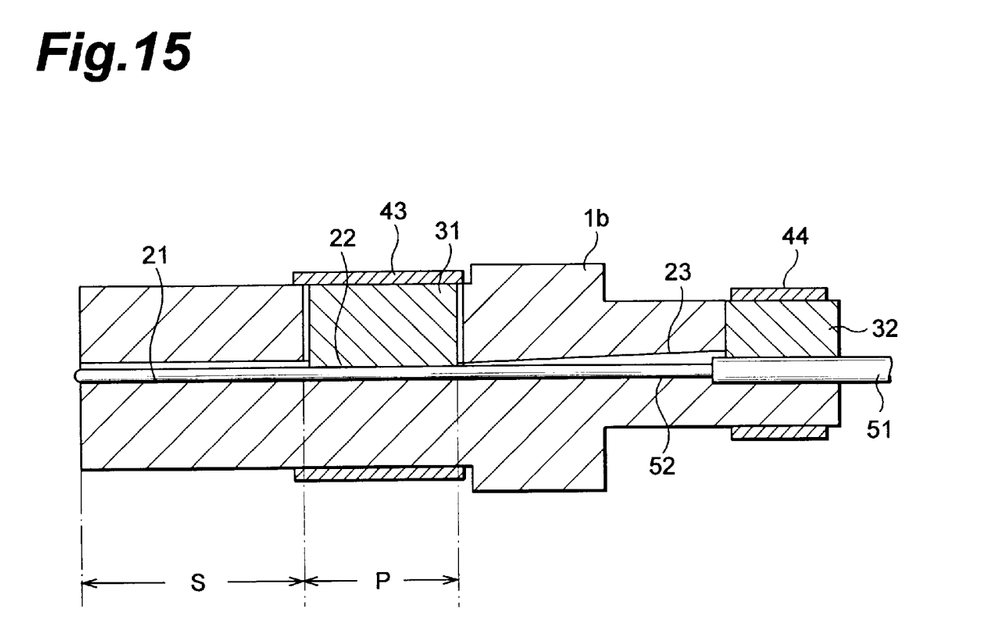
FIG. 15 is a vertical sectional view thereof.

FIG. 14 is an exploded perspective view showing a third embodiment of the optical connector in accordance with the present invention, whereas FIG. 15 is a vertical sectional view thereof. The ferrule 1b of the optical connector in this embodiment is identical to the ferrule 1 of the first embodiment in terms of their basic configuration. This optical connector comprises a pressing member 31 disposed on the aligning grooves 22, and a pressing member 32 disposed on the coating 51 of the fiber ribbon 50 mounted on the bottom face 18. By holding the pressing members 31, 32 with clamp members 43, 44, respectively, the optical fibers 52 and the coating 51 are pressed so as to be fixed to the ferrule 1b.

In this embodiment, after the optical fibers 52 are compressed in a manner similar to the compressing step of the first embodiment shown in FIGS. 6 and 7, the clamp members 43, 44 hold the pressing members 31, 32, respectively, such that their spring forces firmly press the optical fibers 52 and the coating 51, thereby securing the fiber ribbon 50 to the ferrule 1b. As a consequence, the optical connector can be manufactured easily, securely, and rapidly.

The clamp members 43, 44 are preferably made of phosphor bronze or cold-worked stainless steel, so as to yield a strong spring force and a high durability, thus assuring long-term reliability in clamp force.

In each of the embodiments explained above, the fiber ribbon 50 should not be restricted to 4 cores but may be a 2-core to 16-core fiber ribbon, for example, as long as it has a plurality of cores.

Also, without projecting all the tip faces 53 of the optical fibers 52 from their optical connecting orifices 13, the tip face 53 of at least one of the plurality of optical fibers 52 may be disposed within the positioning hole 21. In this case, it is important that the positioning hole 21 be filled with the refractive-index-matching agent 42. It is favorable in that the refractive-index-matching agent is supplied to the connecting end faces upon PC connection, whereby transmission loss can further be suppressed.

Though explained in the foregoing are examples where the main body of the ferrule is provided with aligning grooves, optical fibers may be directly secured at the rear portion of the positioning holes without providing the aligning grooves. Alternatively, compression may be effected with grooves provided on the pressing member side. Providing grooves on the ferrule side, however, is advantageous in that the longitudinal compression can be guided securely.

As explained in the foregoing, in accordance with the present invention, since optical fibers are disposed in a compressible state within fiber-positioning holes disposed on the optical connecting end face side of the optical connector, the optical fibers are compressed upon PC connection, thus allowing secure PC connection and yielding less optical transmission loss. Also, since each optical fiber is in a diametrically fixed state within its positioning hole, there is no fear of generating buckling or flexure, whereby the fibers are prevented from breaking.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical connector in which an optical fiber is fixed within a ferrule such that a tip of said optical fiber is disposed at a front end face position of said ferrule, wherein an optical-fiber-positioning hole formed so as to directly extend into said ferrule from an optical connecting orifice formed in said front end face of said ferrule has a diameter greater than a diameter of said optical fiber positioned within said optical-fiber-positioning hole, said optical-fiber-positioning hole having therein a compressible unfixing area for allowing said optical fiber to compress along said optical-fiber-positioning hole, and a fixing area, disposed behind said compressible unfixing area, for fixing said optical fiber to said ferrule.

2. An optical connector according to claim 1, wherein said ferrule has a plurality of optical-fiber-positioning holes, a plurality of optical fibers being arranged one by one within the respective optical-fiber-positioning holes so as to be longitudinally movable therein and such that amounts of fluctuation in tip face positions thereof are not greater than permissible amounts of compression of the respective optical fibers within said optical-fiber-positioning holes.

3. An optical connector according to claim 1, further comprising an optical-fiber-aligning groove, formed behind said optical-fiber-positioning hole, for disposing said optical fiber; and an optical-fiber-pressing member for fixing said optical fiber within said optical-fiber-aligning groove by pressing said optical fiber against a wall face of said optical-fiber-aligning groove.

4. An optical connector according to claim 3, wherein said aligning groove has substantially a C-like shape, an inside diameter slightly greater than an outside diameter of said optical fiber, and a depth and an opening width of an upper part of the groove each of which is smaller than the outside diameter of said optical fiber, said optical fiber projecting from said opening.

5. An optical connector according to claim 1, wherein said optical fiber is pre-compressed such that the tip face thereof aligns substantially in parallel with said front end face of said ferrule.

6. An optical connector according to claim 1, wherein said optical-fiber-positioning hole in said compressible unfixing area is filled with a refractive-index-matching agent.

7. An optical connector according to claim 6, wherein said fixing area is filled with an adhesive for fixing.

8. A method of making an optical connector in which a plurality of optical fibers are secured within a ferrule such that end faces thereof align with each other with a predetermined pitch near a front end face position of said ferrule, said method comprising a step of arranging said optical fibers with substantially uniformly cut-off tips, one by one, into tubular fiber-positioning holes each having an inside diameter greater than an outside diameter of each said optical fiber and straightly extending inward from said front end face of said ferrule, said optical fibers being arranged so as to be longitudinally movable and such that amounts of fluctuation in tip face positions thereof are not greater than permissible amounts of compression of the respective fibers within said fiber-positioning holes; and a step of securing said optical fibers to said ferrule behind said fiber-positioning holes.

9. A method of making an optical connector according to claim 8, wherein said ferrule further comprises an aligning groove portion, continuously formed with each said fiber-positioning hole so as to extend therebehind, having a slit-shaped opening on a face; and a guide portion, continuously formed with said aligning groove portion and shaped like a groove or partly shaped like a tube, having an inside diameter gradually increasing along a direction away from said aligning groove portion; and wherein said optical fiber is inserted into said fiber-positioning hole from a rear end of said guide portion by way of said aligning groove portion in said aligning step, and a peripheral portion of said optical fiber projecting from said slit-shaped opening is secured in said securing step.

10. A method of making an optical connector according to claim 9, wherein said aligning groove has substantially a C-shaped cross section with an inside diameter slightly greater than an outside diameter of said optical fiber, said aligning groove having a depth and a width of said slit-like opening each smaller than the outside diameter of said optical fiber.

11. A method of making an optical connector according to claim 8, further comprising, subsequent to said aligning step, an adjusting step of longitudinally compressing said optical fibers in the respective fiber-positioning holes such that tip positions thereof are aligned substantially in parallel to said front end face.

12. A method of making an optical connector according to claim 11, wherein a pressing member for restricting only a diametrical movement of said optical fibers is disposed behind said fiber-positioning holes in said adjusting step.

* * * * *